United States Patent
Ojima et al.

(10) Patent No.: US 10,124,604 B2
(45) Date of Patent: Nov. 13, 2018

(54) PRINTING APPARATUS AND METHOD FOR MANUFACTURING CAN ON WHICH IMAGE IS FORMED

(71) Applicant: SHOWA ALUMINUM CAN CORPORATION, Tokyo (JP)

(72) Inventors: Shinichi Ojima, Tokyo (JP); Kazunori Ikeda, Tokyo (JP); Tetsuo Kashiwazaki, Tokyo (JP); Asumi Suwa, Tokyo (JP)

(73) Assignee: SHOWA ALUMINUM CAN CORPORATION, Tokyo (JP)

( * ) Notice: Subject to any disclaimer, the term of this patent is extended or adjusted under 35 U.S.C. 154(b) by 0 days.

(21) Appl. No.: 15/121,528

(22) PCT Filed: Mar. 2, 2015

(86) PCT No.: PCT/JP2015/056089
§ 371 (c)(1),
(2) Date: Aug. 25, 2016

(87) PCT Pub. No.: WO2015/151689
PCT Pub. Date: Oct. 8, 2015

(65) Prior Publication Data
US 2016/0355025 A1    Dec. 8, 2016

(30) Foreign Application Priority Data
Apr. 1, 2014 (JP) ................................. 2014-075735

(51) Int. Cl.
*B41J 3/407* (2006.01)
*G06K 15/00* (2006.01)
(Continued)

(52) U.S. Cl.
CPC ............. *B41J 3/4073* (2013.01); *B41F 17/18* (2013.01); *B41J 2/01* (2013.01); *B41J 29/023* (2013.01); *G06K 15/00* (2013.01)

(58) Field of Classification Search
CPC . B41J 3/4073; B41J 2/01; B41J 29/023; B41J 11/007; B41J 15/78; B41F 17/18;
(Continued)

(56) References Cited

U.S. PATENT DOCUMENTS 6,890,061 B1    5/2005 Freire et al.
2013/0176358 A1    7/2013 Yamada et al.
(Continued)

FOREIGN PATENT DOCUMENTS

CN    103328336 A    9/2013
CN    103492272 A    1/2014
(Continued)

OTHER PUBLICATIONS

International Search Report for PCT/JP2015/056089 dated May 12, 2015.

*Primary Examiner* — Sharon A Polk
(74) *Attorney, Agent, or Firm* — Sughrue Mion, PLLC

(57) ABSTRACT

The printing apparatus is provided with two inkjet heads that eject ink of the same color as in a first cyan inkjet head (20C1) and a second cyan inkjet head (20C2). The first cyan inkjet head (20C1) and the second cyan inkjet head (20C2) are disposed so that the respective positions in the conveyance direction of the can (10) differ from each other and are disposed so that the positions in the axial direction of the can (10) differ from each other. A first magenta inkjet head (20M1) for ejecting magenta ink is provided at a position adjacent to the second cyan inkjet head (20C2) in the axial direction of the can (10).

9 Claims, 12 Drawing Sheets

(51) Int. Cl.
*B41F 17/18* (2006.01)
*B41J 29/02* (2006.01)
*B41J 2/01* (2006.01)

(58) Field of Classification Search
CPC ........ B41F 17/20; G06K 15/00; G06K 17/00;
B65G 2201/0252; B65G 47/088
See application file for complete search history.

(56) References Cited

U.S. PATENT DOCUMENTS

2014/0028771 A1* 1/2014 Yamada ................. B41J 2/0057
347/104
2014/0368841 A1 12/2014 Ojima et al.

FOREIGN PATENT DOCUMENTS

| | | |
|---|---|---|
| JP | 2002-210939 A | 7/2002 |
| JP | 2004-299252 A | 10/2004 |
| JP | 2005-178379 A | 7/2005 |
| JP | 2012-232771 A | 11/2012 |
| JP | 2013-169975 A | 9/2013 |
| JP | 2015-30181 A | 2/2015 |
| WO | 2013/099817 A1 | 7/2013 |

* cited by examiner

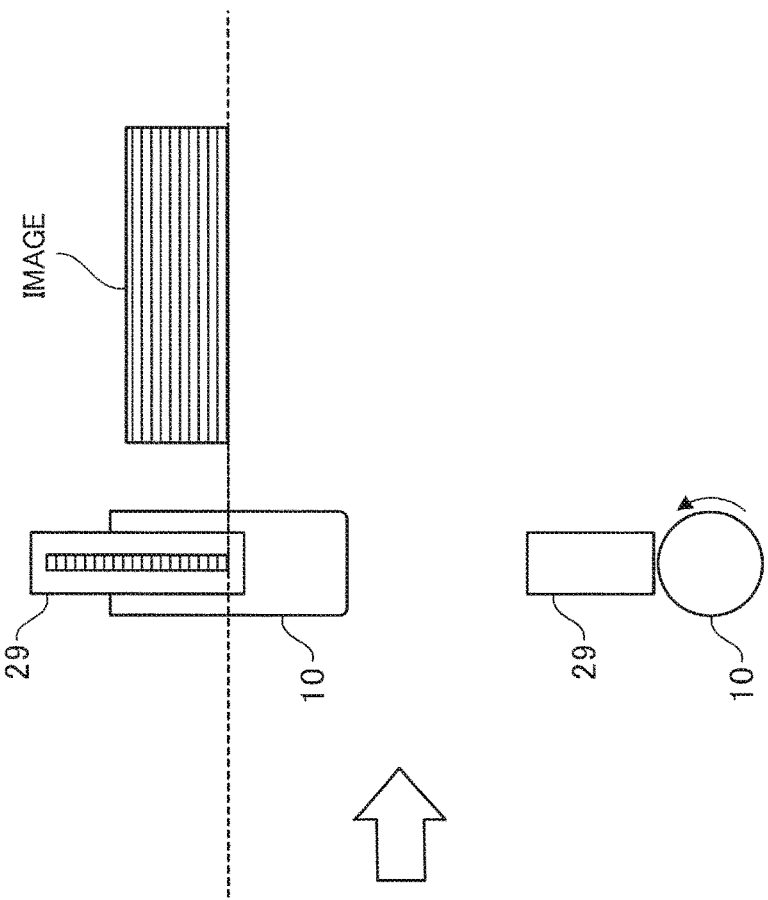

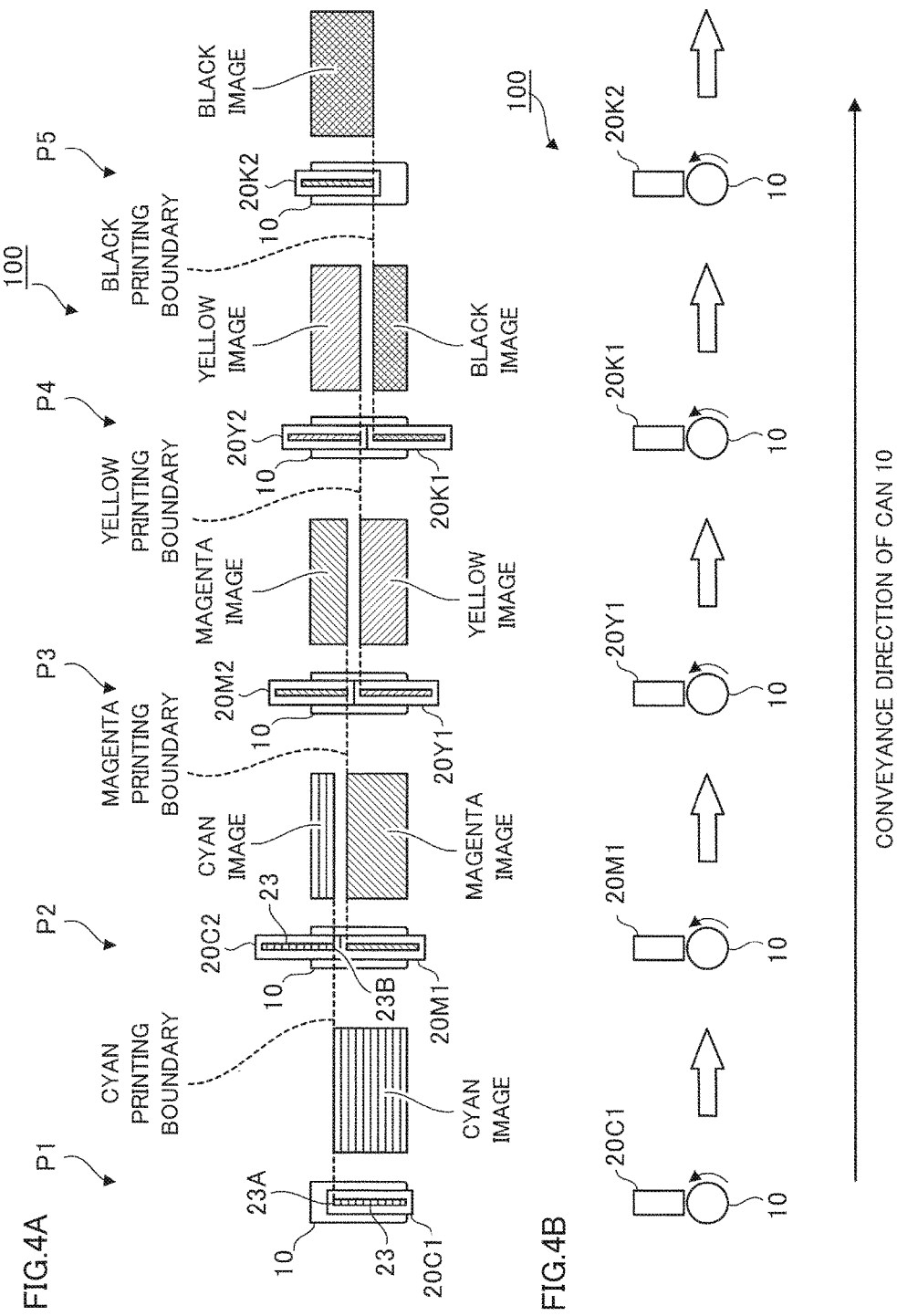

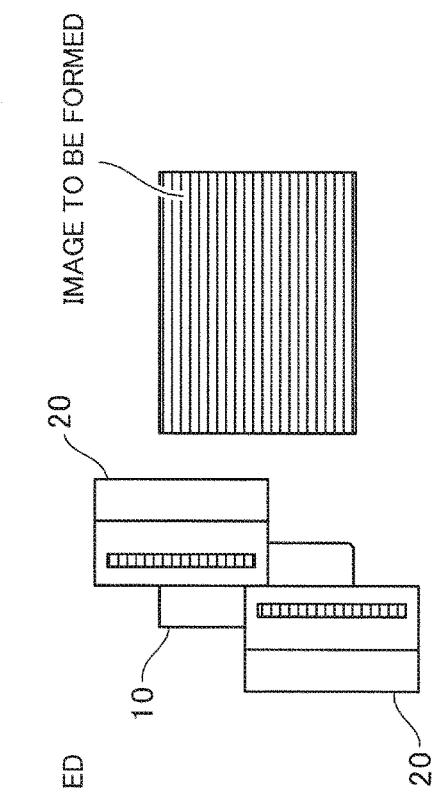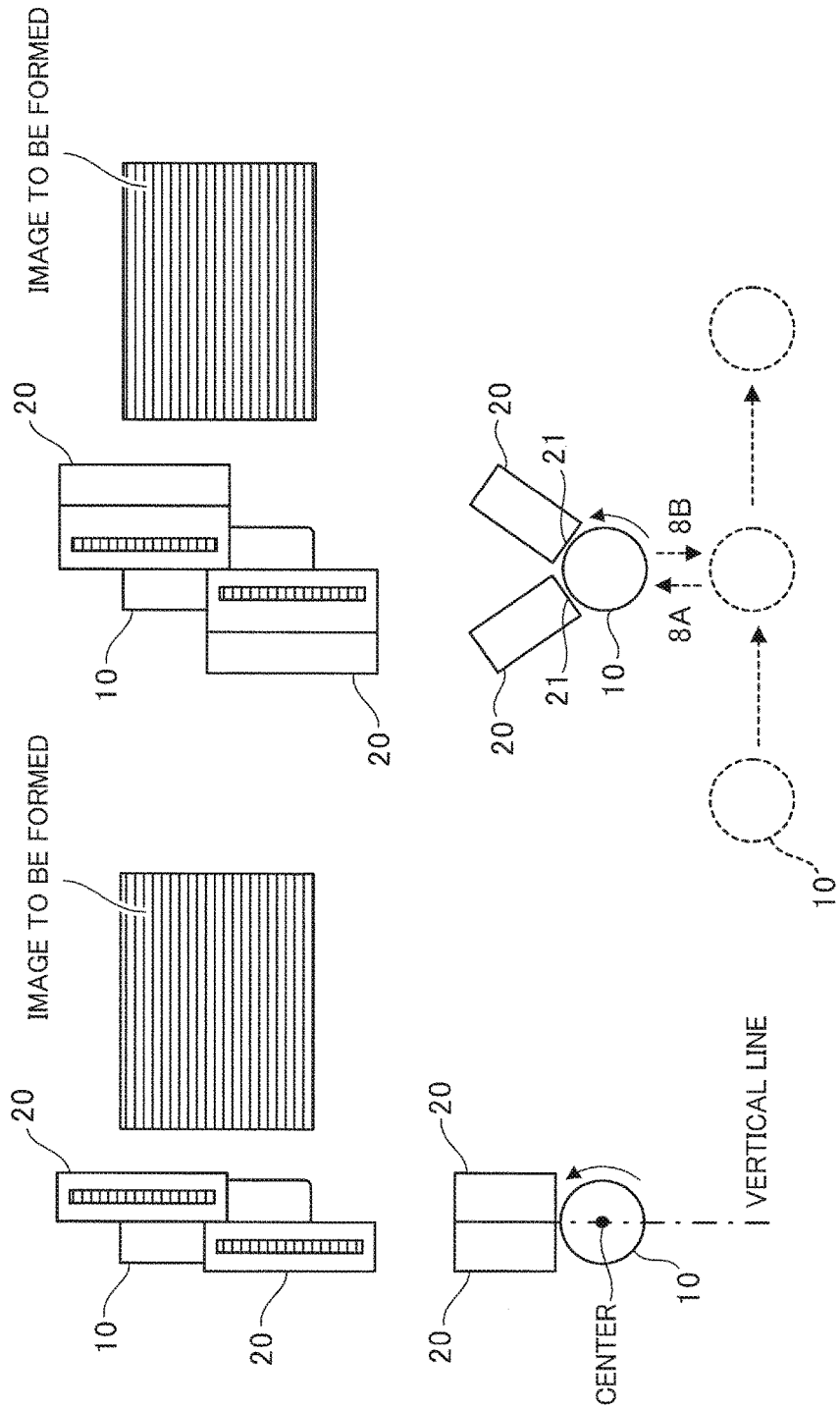

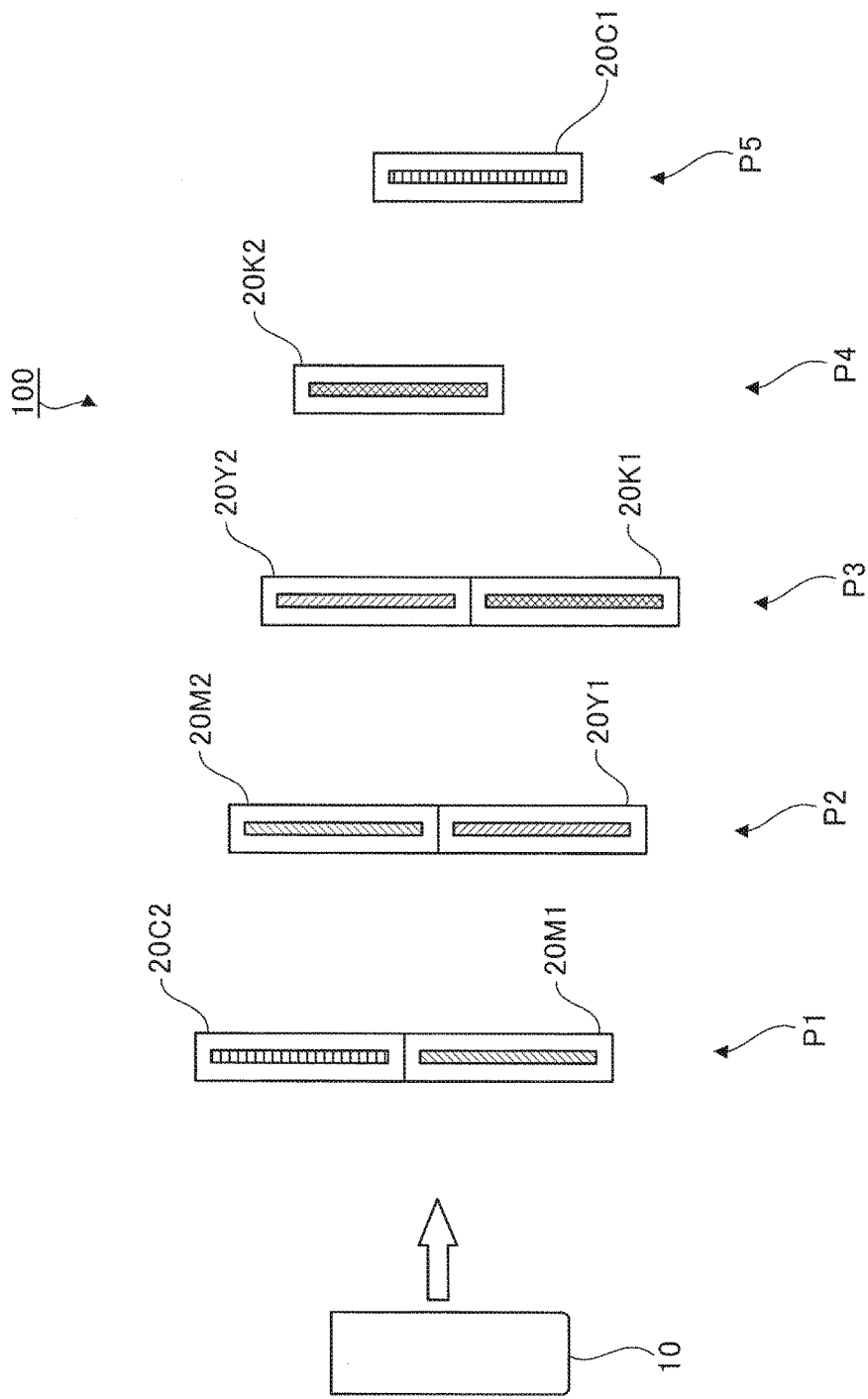

PRINTING APPARATUS AND METHOD FOR MANUFACTURING CAN ON WHICH IMAGE IS FORMED

CROSS REFERENCE TO RELATED APPLICATIONS

This application is a National Stage of International Application No. PCT/JP2015/056089 filed Mar. 2, 2015, claiming priority based on Japanese Patent Application No. 2014-075735 filed Apr. 1, 2014, the contents of all of which are incorporated herein by reference in their entirety.

TECHNICAL FIELD

The present invention relates to a printing apparatus and a method for manufacturing a can on which an image is formed.

BACKGROUND ART

Patent Document 1 discloses a printing device in which inkjet printing is performed in at least one inkjet printing station and plural inkjet heads are disposed in the inkjet printing station.

CITATION LIST

Patent Literature

Patent Document 1: Japanese Patent Application Laid-Open Publication No. 2012-232771

SUMMARY OF INVENTION

Technical Problem

When an image composed of plural colors is to be formed on a can, for example, image formation on a can is able to be performed by, while conveying the can along a predetermined conveyance route, ejecting ink to the can on the conveyance route from plural inkjet heads provided on different positions in the conveyance direction of the can.

Incidentally, in a case such that an inkjet head is shorter than the total length of a can, it becomes necessary to prepare plural inkjet heads for each color in some cases, and accordingly, the total number of inkjet heads is increased. If the total number of inkjet heads is increased in this manner, the inkjet heads are disposed over broader region, which results in upsizing of a printing apparatus.

An object of the present invention is to downsize a printing apparatus that forms an image composed of plural colors by use of inkjet heads, in which plural inkjet heads are provided for each color.

Solution to Problem

A printing apparatus to which the present invention is applied includes: a conveyance unit that conveys a can in a cylindrical shape along a predetermined conveyance route; and an image formation unit that forms an image composed of plural colors onto an outer circumferential surface of the can on the conveyance route by use of plural inkjet heads prepared for the respective colors, wherein, among inkjet heads included in the plural inkjet heads, each of same-color inkjet heads ejecting ink of same color is disposed at a position different from one another in a conveyance direction of the can, and is disposed at a position, which is also a position against the can when image formation onto the can is performed, different from one another in an axial direction of the can and along the axial direction of the can, the each of the same-color inkjet heads performing image formation onto a partial region of the can in the axial direction thereof, and, at an adjacent location that is adjacent to at least one same-color inkjet head, among the individual same-color inkjet heads included in the same-color inkjet heads, which is also an adjacent location that is adjacent to the same-color inkjet head in a longitudinal direction thereof, an inkjet head that ejects ink of a color different from the same-color inkjet head toward the can is provided.

Here, a same-color inkjet head group is configured with plural same-color inkjet heads, plural same-color inkjet head groups are provided to correspond to the plural colors that compose the image, respectively, the plural provided same-color inkjet head groups are disposed at positions different from one another in the conveyance direction of the can, and each of the same-color inkjet head groups is disposed such that, at the adjacent location of a same-color inkjet head positioned at a most downstream side in the conveyance direction of the can, among the same-color inkjet heads included in one of the same-color inkjet head groups positioned at an upstream side in the conveyance direction of the can, a same-color inkjet head included in one of the other same-color inkjet head group positioned at the downstream side, which is also a same-color inkjet head positioned at a most upstream side in the conveyance direction, is positioned. In this case, the same-color inkjet heads are disposed collectively for each color, and therefore, as compared to a case in which the same-color inkjet heads are not disposed collectively for each color, the configuration of the apparatus can be simplified.

Moreover, the plural colors composing the image include black, and the same-color inkjet head group ejecting black ink is disposed at a most downstream side in the conveyance direction of the can.

Moreover, when image formation onto the can is performed, each of the individual same-color inkjet heads included in the same-color inkjet head group is positioned just above the can and ejects ink in a vertically downward direction, to perform image formation onto the can. In this case, as compared to a case in which the inkjet head is not disposed just above the can or a case in which ejection of ink is performed in a direction other than the vertical direction, it becomes possible to improve quality of the image to be formed on the can.

From another point of view, a printing apparatus to which the present invention is applied includes: a rotation unit that rotates a can in a cylindrical shape in a circumferential direction; and an image formation unit that forms an image composed of plural colors onto an outer circumferential surface of the can rotated by the rotation unit by use of plural inkjet heads prepared for the respective colors, wherein, among inkjet heads included in the plural inkjet heads, each of same-color inkjet heads ejecting ink of same color is disposed at a position different from one another in a rotation direction of the can, and is disposed at a position different from one another in an axial direction of the can and along the axial direction of the can, to perform image formation onto a partial region of the can in the axial direction thereof, and, at an adjacent location that is adjacent to at least one same-color inkjet head, among the individual same-color inkjet heads included in the same-color inkjet heads, which is also an adjacent location that is adjacent to the same-color inkjet head in a longitudinal direction thereof, an inkjet head that ejects ink of a color different from the same-color inkjet head toward the can is provided.

Moreover, if the present invention is grasped as a method for manufacturing a can on which an image is formed, the method for manufacturing a can on which an image is formed to which the present invention is applied includes: conveying a can in a cylindrical shape along a predetermined conveyance route; and forming an image composed of plural colors onto an outer circumferential surface of the can on the conveyance route by use of plural inkjet heads prepared for the respective colors, wherein, among inkjet heads included in the plural inkjet heads, each of same-color inkjet heads ejecting ink of same color is disposed at a position different from one another in a conveyance direction of the can, and is disposed at a position, which is also a position against the can when image formation onto the can is performed, different from one another in an axial direction of the can and along the axial direction of the can, the each of the same-color inkjet heads performing image formation onto a partial region of the can in the axial direction thereof, and, at an adjacent location that is adjacent to at least one same-color inkjet head, among the individual same-color inkjet heads included in the same-color inkjet heads, which is also an adjacent location that is adjacent to the same-color inkjet head in a longitudinal direction thereof, an inkjet head that ejects ink of a color different from the same-color inkjet head toward the can is provided.

From another point of view, a method for manufacturing a can on which an image is formed to which the present invention is applied includes: rotating a can in a cylindrical shape in a circumferential direction; and forming an image composed of plural colors onto an outer circumferential surface of the rotating can by use of plural inkjet heads prepared for the respective colors, wherein, among inkjet heads included in the plural inkjet heads, each of same-color inkjet heads ejecting ink of same color is disposed at a position different from one another in a rotation direction of the can, and is disposed at a position different from one another in an axial direction of the can and along the axial direction of the can, to perform image formation onto a partial region of the can in the axial direction thereof, and, at an adjacent location that is adjacent to at least one same-color inkjet head, among the individual same-color inkjet heads included in the same-color inkjet heads, which is also an adjacent location that is adjacent to the same-color inkjet head in a longitudinal direction thereof, an inkjet head that ejects ink of a color different from the same-color inkjet head toward the can is provided.

Advantageous Effects of Invention

According to the present invention, it is possible to downsize a printing apparatus that forms an image composed of plural colors by use of inkjet heads, in which plural inkjet heads are provided for the respective colors.

BRIEF DESCRIPTION OF DRAWINGS

FIGS. 3A and 3B are diagrams showing still another arrangement example of the inkjet head;
FIGS. 4A and 4B are diagrams for illustrating a printing apparatus of an exemplary embodiment;
FIGS. 8A and 8B are diagrams showing still another arrangement example of the inkjet head;
FIG. 11 is a diagram schematically showing still another configuration example of the printing apparatus of the exemplary embodiment.

DESCRIPTION OF EMBODIMENTS

Hereinafter, an exemplary embodiment according to the present invention will be described in detail with reference to attached drawings.

Figure 1A:
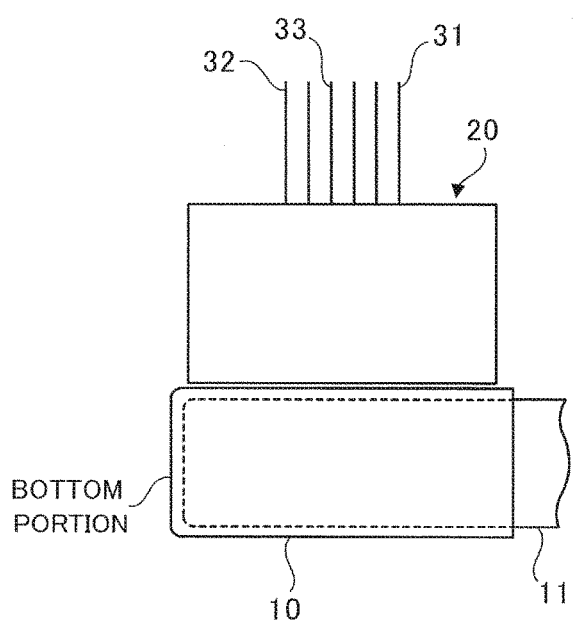
FIGS. 1A to 1C are diagrams illustrating an inkjet head that performs image formation onto a can.
Figure 1B:
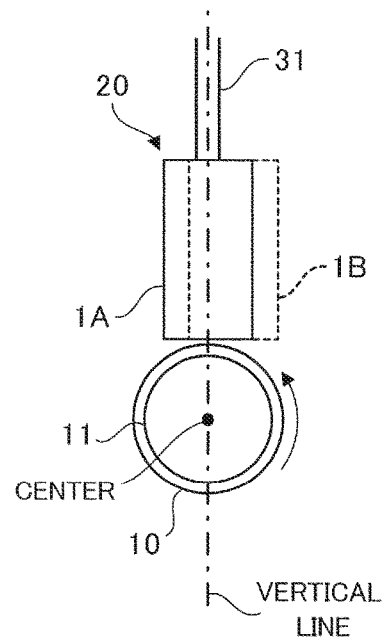
Figure 1C:
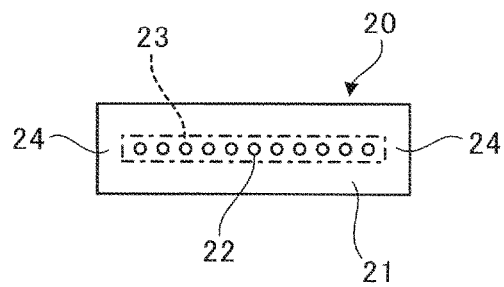

FIGS. 1A to 1C are diagrams illustrating an inkjet head that performs image formation onto a can. Note that FIG. 1A is an elevational view of the inkjet head, etc., FIG. 1B is a right side view of the inkjet head, etc., and FIG. 1C is a diagram showing a bottom surface of the inkjet head (a facing surface that faces an outer circumferential surface of the can).

An inkjet head 20 is, as shown in FIG. 1A, disposed along an axial direction of a can 10 formed into a cylindrical shape, and ejects ink toward the outer circumferential surface of the can 10 to form an image on the can 10. As shown in FIG. 1A, an ink supply tube 31 and an ink discharge tube 32 are attached to the inkjet head 20. The ink supply tube 31 and the ink discharge tube 32 are connected to a not-shown ink tank.

When the ink has been consumed by the inkjet head 20, new ink is supplied to the inkjet head 20 through the ink supply tube 31. Moreover, ink having been excessively supplied is returned to the ink tank through the ink discharge tube 32. Consequently, the inkjet head 20 is filled with ink of a predetermined constant amount.

As shown in FIG. 1C, on a bottom surface 21 of the inkjet head 20, plural ink ejection holes 22 for ejecting ink as very small droplets are formed. Note that the bottom surface 21 of the inkjet head 20 faces the can 10 with a constant distance (gap) interposed therebetween.

The ink ejection holes 22 are formed much smaller than those in a state shown in FIG. 1C. Moreover, in the actual inkjet head 20, a larger number of ink ejection holes 22 are formed than those shown in FIG. 1C.

Moreover, the ink ejection holes 22 are disposed in line along the longitudinal direction of the inkjet head 20, and are formed in a predetermined formation region (hereinafter, referred to as "ink ejection holes formation region 23"). As shown in FIG. 1C, the ink ejection holes formation region 23 is formed in a center portion in the longitudinal direction of the inkjet head 20, and, in the longitudinal direction of the inkjet head 20, there exists a region in which the ink ejection holes 22 are not formed (hereinafter, referred to as "non-formation region 24") outside (on either side of) the ink ejection holes formation region 23.

Moreover, as shown in FIG. 1A, a drive cable 33 is connected to the inkjet head 20. The drive cable 33 is connected to a not-shown control device, and a drive signal is outputted from the control device to the inkjet head 20 via the drive cable 33. Based on the drive signal, the inkjet head 20 performs ejection of ink toward the can 10. Note that, at this time, the can 10 is rotated in a circumferential direction, and accordingly, an image extending not only in the axial direction, but also in the circumferential direction, is formed on the can 10. When the can 10 has been rotated 360 degrees, ink ejection is finished, and thereby image formation on the can 10 is finished.

Note that, inside the can 10, a mandrel 11 which is cylindrically formed and functions as a support member supporting the can 10 is inserted; accordingly, rotation of the can 10 is performed by rotation of the mandrel 11.

Moreover, though description has been omitted in the above, the can 10 is formed into a cylindrical shape and one end portion thereof is closed, and is configured to have a bottom portion provided to the one end portion. Moreover, on the other end portion of the can 10, an opening is formed, and the mandrel 11 is inserted into the inside of the can 10 through the opening.

Here, it is desirable that the ejection direction of ink ejected from the ink ejection hole 22 is a vertically downward direction, and if the inkjet head 20 is inclined with respect to the vertical direction and the ink is ejected in a direction with an angle to the vertical direction, an error is likely to occur in the position of adhesion of ink to the can 10.

In general, in the inkjet head 20, if ejection of ink is continuously performed, the ink gradually adheres to outlet portions of the ink ejection holes 22, and thereby ink accumulation is formed on the outlet portions in some cases. As described above, if the ink is ejected in the direction with an angle to the vertical direction, ink gathers to lower locations in the outlet portions, and accordingly, ink accumulation is apt to be formed in these portions.

Then, in this case, being affected by the ink accumulation, there is a possibility that the ejection direction of ink differs from the original direction thereof. In this case, ink adhering positions on the can 10 are apt to be different from the original positions. Therefore, as described above, the ejection direction of ink ejected from the ink ejection holes 22 is desirably in the vertically downward direction.

Further, it is preferable that the inkjet head 20 is disposed on a vertical line passing through the center of the can 10 as the inkjet head 20 indicated by a solid line in FIG. 1B (the inkjet head 20 indicated by the reference sign 1A). To additionally describe, it is preferable that the inkjet head 20 is disposed right above the can 10. To put it in another way, it is preferable that the inkjet head 20 is disposed in a direction passing through the center of the can 10 and in a direction perpendicular to the moving direction (conveyance direction) of the can 10.

Here, it can also be considered that the inkjet head 20 is disposed on a vertical line, which is not a vertical line passing through the center of the can 10, as the inkjet head 20 indicated by a broken line in FIG. 1B (the inkjet head 20 indicated by the reference sign 1B).

By the way, in this case, the ink ejected from the inkjet head 20 adheres, not to a top portion of the can 10, but to a lateral side of the top portion. In such a case, the shape of the ink adhered to the can 10 is likely to expand in the circumferential direction of the can 10. To additionally describe, the shape of the ink adhered to the can 10 is likely to expand in the circumferential direction of the can 10 as compared to a case in which the ink is ejected to the top portion of the can 10. Therefore, it is preferable that the inkjet head 20 is disposed on the vertical line passing through the center of the can 10.

FIG. 1 exemplifies a case in which the inkjet head 20 is shorter than the length of the can 10 in the axial direction; in this case, it becomes difficult to form an image over the entire region on the outer circumferential surface of the can 10.

Figure 2A:
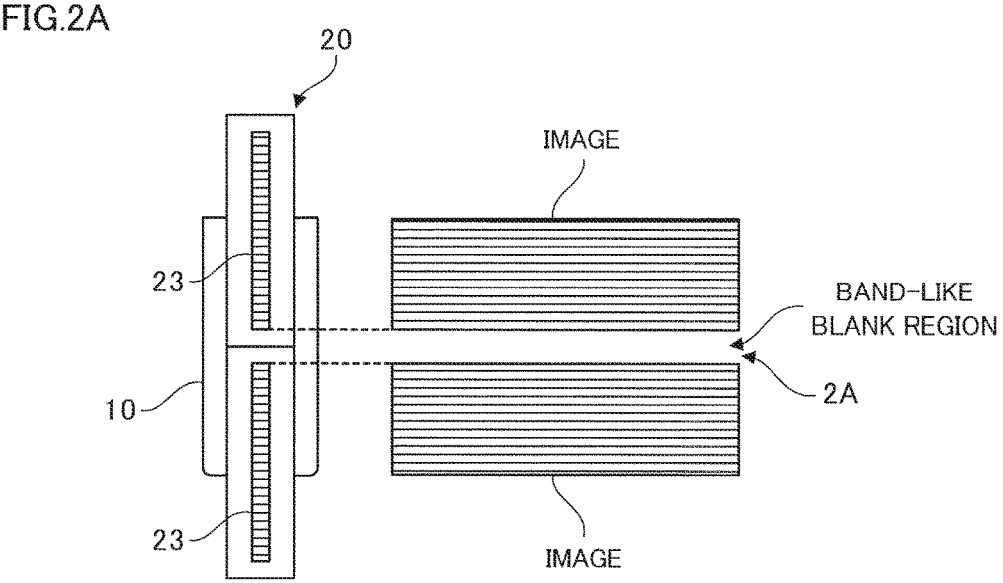
FIGS. 2A and 2B are diagrams showing another arrangement example of the inkjet head.
Figure 2B:
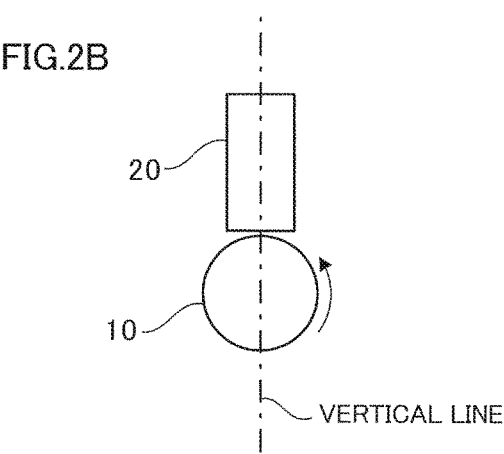

In a case like this, for example, as shown in FIGS. 2A and 2B (diagrams showing another arrangement example of the inkjet head 20), plural inkjet heads 20 are disposed in line along the axial direction of the can 10. In this case, it results in that as if a pseudo large inkjet head 20 is placed, and therefore, image formation can be performed in a region broader than the region in the mode shown in FIGS. 1A to 1C. Note that FIG. 2A is a diagram showing a state of the inkjet head 20 as viewed from above, and FIG. 2B is a diagram showing a state of the inkjet head 20 as viewed from the front.

To make a supplementary description, the left side view in FIG. 2A shows the inkjet head 20 disposed above the can 10 and viewed from above. At this time, since the ink ejection holes are formed on a reverse side of the inkjet head 20 (the surface facing the can 10), the ink ejection holes cannot be seen from above in actuality; however, for ease of comprehension, the ink ejection holes formation region 23 are willing to be represented by solid lines. Moreover, the image formed on the can 10 by the inkjet head 20 actually has a curved surface; however, for ease of comprehension, the image is developed as a planar surface in the right side view in FIG. 2A. In some cases, these are followed in FIGS. 2A, 2B and figures subsequent thereto.

Incidentally, as described above, the non-formation region 24, where the ink ejection holes 22 are not formed, is formed in the inkjet head 20 in many cases; accordingly, if plural inkjet heads 20 are simply disposed in line along the axial direction of the can 10, due to the non-formation region 24, a band-like region, in which no image is formed (hereinafter, referred to as "band-like blank region") is formed, as indicated by the reference sign 2A in FIG. 2A.

Here, occurrence of the band-like blank region can be prevented by the printing mode shown in FIGS. 3A and 3B (diagrams showing still another arrangement example of the inkjet head 20).

In the printing mode, a first inkjet head 28 and a second inkjet head 29 are displaced from each other in the conveyance direction of the can 10, and the first inkjet head 28 and the second inkjet head 29 are overlapped in the axial direction of the can 10. By overlapping the first inkjet head 28 and the second inkjet head 29 in this manner, occurrence of the above-described band-like blank region is suppressed, to thereby allow an image to be formed over the entire region on the outer circumferential surface of the can 10.

Note that, in the printing mode shown in FIGS. 3A and 3B, an image is formed on a region of the outer circumferential surface of the can 10, which is positioned on the lower side of the figure, by use of the first inkjet head 28, and thereafter, as shown in FIG. 3B, the can 10 is moved below the second inkjet head 29, and the rest of the image is formed by use of the second inkjet head 29.

To additionally describe, in the printing mode, the image to be formed is divided by a predetermined boundary, then, one of the divided images is formed by use of the first inkjet head 28 and the other of the divided images is formed by use of the second inkjet head 29.

Here, for example, in the case where image formation onto the can 10 is performed by using plural colors, such as cyan, magenta, yellow and black, a pair of the first inkjet head 28 and the second inkjet head 29 shown in FIGS. 3A and 3B is made, for example, and plural pairs of inkjet heads 20 are prepared.

Then, to begin with, by use of the first pair of inkjet heads 20, a cyan image, for example, is formed on the outer circumferential surface of the can 10.

Subsequently, by use of the second pair of inkjet heads 20 disposed downstream of the first pair of inkjet heads 20, a magenta image is formed; next, by use of the third pair of inkjet heads 20 disposed on a further downstream side, a yellow image is formed. Finally, by use of the fourth pair of inkjet heads 20, a black image is formed.

If two inkjet heads 20 are provided for each color and positions of the respective inkjet heads 20 are displaced from each other in the conveyance direction of the can 10 in this manner, 8 printing positions are provided in total, and therefore, upsizing of the printing apparatus is likely to be brought about.

Moreover, if all of the 8 inkjet heads 20 are used at the same time to perform printing on the can 10 concurrently, a need arises to prepare 8 mandrels 11 in total. Further, in this case, a need arises to prepare a mechanism for driving the mandrel 11 or a mechanism for moving the mandrel 11 for each mandrel 11, and accordingly, increase in manufacturing costs of the apparatus or increase in complexity of the apparatus is likely to be brought about.

Next, a printing apparatus 100 of the exemplary embodiment will be described.

FIGS. 4A and 4B are diagrams for illustrating the printing apparatus 100 of the exemplary embodiment. Note that, in FIGS. 4A and 4B, a state of the printing apparatus 100 as viewed from above is shown in an upper stage of the figure (in the location indicated in FIG. 4A), and a state of the printing apparatus 100 as viewed from the front is shown in a lower stage of the figure (in the location indicated in FIG. 4B).

In the printing apparatus 100 of the exemplary embodiment, the can 10 moves toward the right direction in the figure. To additionally describe, the can 10 moves toward the right direction in the figure along the predetermined conveyance route. Further, in the printing apparatus 100 of the exemplary embodiment, a first printing position P1 to a fifth printing position P5 are provided in the order from an upstream side in the conveyance direction toward a downstream side in the conveyance direction of the can 10.

At the first printing position P1, a first cyan inkjet head 20C1 that ejects cyan ink is provided. At the first printing position P1, a cyan image is formed onto a portion of the outer circumferential surface of the can 10, which is on a lower side in the figure (refer to FIG. 4A), by the first cyan inkjet head 20C 1. To additionally describe, the cyan image is formed not over the entire region in the axial direction of the can 10, but on a partial region in the axial direction of the can 10.

To describe in detail, at the first printing position P1, the cyan ink is ejected from the first cyan inkjet head 20C 1 toward the rotating can 10. Then, when the can 10 has been rotated 360 degrees since the start of the ink ejection, the ink ejection is finished. Consequently, the cyan image is formed onto a portion of the outer circumferential surface of the can 10, which is on a lower side in the figure. Note that rotation of the can 10 in the circumferential direction (rotation of the mandrel 11 (not shown in FIGS. 4A and 4B)) is continuously performed until image formation at the fifth printing position P5 is finished.

The image formed by the first cyan inkjet head 20C1 is not the entire image formed with the cyan ink, but a part thereof. To additionally describe, the image formed by the first cyan inkjet head 20C 1 is, of the entire image formed with the cyan ink, an image positioned below a cyan printing boundary in the figure.

To describe further, the image formed by the first cyan inkjet head 20C 1 is an image formed in one of two regions generated by dividing at the cyan printing boundary, the region being on the outer circumferential surface of the can 10. To additionally describe, since the first cyan inkjet head 20C1 does not face the entire region in the axial direction of the can 10, the cyan image is formed on the partial region in the axial direction of the can 10 in the exemplary embodiment.

Note that, though description has been omitted in the above, in the printing apparatus 100 of the exemplary embodiment, other than the inkjet head 20, a control device (not shown) for controlling the inkjet head 20 is provided. The control device is provided with a computing section that creates image data for each color, such as C (cyan), M (magenta), Y (yellow) and K (black), from image data originating an image.

Moreover, the control device is provided with a data storage section that stores image data for each color created by the computing section. Further, there is provided an inkjet head controlling section that transmits an output signal including information about ejection timing, an ejection amount, the number of ejection times of the ink to each of the inkjet heads 20, to thereby drive the inkjet heads 20.

Next, the second printing position P2 will be described.

At the second printing position P2, a second cyan inkjet head 20C2 and a first magenta inkjet head 20M1 are disposed. When the can 10 arrives at the second printing position P2, ejection of ink is started by each of the second cyan inkjet head 20C2 and the first magenta inkjet head 20M 1.

Then, when the can 10 has been rotated 360 degrees since the start of the ink ejection from the second cyan inkjet head 20C2 and the first magenta inkjet head 20M1, the ink ejection is stopped. Consequently, a cyan image is formed in a region positioned above the cyan printing boundary in the figure (refer to FIG. 4A) and a magenta image is formed in a region positioned below a magenta printing boundary in the figure.

Here, when image formation in the second printing position P2 is finished, the image formed by the first cyan inkjet head 20C1 and the image formed by the second cyan inkjet head 20C2 become continuous with each other at the cyan printing boundary; and therefore, as to cyan, a state is brought about in which the entire image has been formed on the outer circumferential surface of the can 10.

To additionally describe, in the exemplary embodiment, the position of an upper end portion 23A of the ink ejection holes formation region 23 provided to the first cyan inkjet head 20C1 in the figure (refer to FIG. 4A) is aligned with the position of an lower end portion 23B of the ink ejection holes formation region 23 provided to the second cyan inkjet head 20C2 in the figure (refer to FIG. 4A) in the conveyance direction of the can 10.

Consequently, formation of the above-described band-like blank region between the image formed by the first cyan inkjet head 20C1 and the image formed by the second cyan inkjet head 20C2 is prevented, and therefore, the cyan image is formed over the entire region on the outer circumferential surface of the can 10.

Subsequently, the third printing position P3 will be described.

At the third printing position P3, a second magenta inkjet head 20M2 and a first yellow inkjet head 20Y1 are disposed. When the can 10 arrives at the third printing position P3, ejection of ink is started by each of the second magenta inkjet head 20M2 and the first yellow inkjet head 20Y 1. Then, when the can 10 has been rotated 360 degrees since the start of the ink ejection, the ink ejection is stopped.

Consequently, a magenta image is formed in a region positioned above the magenta printing boundary in the figure (refer to FIG. 4A) and a yellow image is formed in a region positioned below a yellow printing boundary in the figure. When image formation in the third printing position P3 is finished, the image formed by the first magenta inkjet head 20M1 and the image formed by the second magenta inkjet head 20M2 become continuous with each other at the magenta printing boundary; and therefore, as to magenta, a state is brought about in which the entire image has been formed on the outer circumferential surface of the can 10.

Next, at the fourth printing position P4, ejection of ink is started by each of a second yellow inkjet head 20Y2 and a first black inkjet head 20K1. Consequently, a yellow image is formed in a region positioned above the yellow printing boundary in the figure (refer to FIG. 4A) and a black image is formed in a region positioned below a black printing boundary in the figure.

When image formation in the fourth printing position P4 is finished, the image formed by the first yellow inkjet head 20Y1 and the image formed by the second yellow inkjet head 20Y2 become continuous with each other at the yellow printing boundary; and therefore, as to yellow, a state is brought about in which the entire image has been formed on the outer circumferential surface of the can 10.

Subsequently, at the fifth printing position P5, ink is ejected by a second black inkjet head 20K2. Consequently, a black image is formed in a region positioned above the black printing boundary in the figure (refer to FIG. 4A).

Accordingly, the image formed by the first yellow inkjet head 20K1 and the image formed by the second black inkjet head 20K2 become continuous with each other at the black printing boundary; and therefore, as to black, a state is brought about in which the entire image has been formed on the outer circumferential surface of the can 10.

Note that, though description has been omitted in the above, in the exemplary embodiment, a rotary encoder for detecting a rotation angle of the mandrel 11 is provided, and registration of images formed at the respective positions of the first printing position P1 to the fifth printing position P5 is carried out based on the output from the rotary encoder.

In this manner, in the printing apparatus 100 of the exemplary embodiment, two inkjet heads 20 ejecting ink of colors different from each other are disposed in line in the axial direction of the can 10 at each of the printing positions. This makes it possible not to arrange the respective inkjet heads 20 in a state being displaced from each other as shown in FIGS. 3A and 3B, and makes it possible to reduce the printing positions as compared to the state shown in FIGS. 3A and 3B. To specifically describe, in the mode shown in FIGS. 3A and 3B, 8 printing positions are needed; however, in the exemplary embodiment, it is sufficient to have only 5 printing positions. In this case, the printing apparatus 100 can be downsized. Further, the number of mandrels 11 to be used can be suppressed.

To describe further, in the mode shown in FIGS. 3A and 3B, like the first cyan inkjet head 20C1 and the second cyan inkjet head 20C2, there are provided two inkjet heads 20 that eject ink of the same color (hereinafter, referred to as "same-color inkjet heads 20"). Then, in the mode shown in FIGS. 3A and 3B, the respective same-color inkjet heads 20 are disposed so that the respective positions in the conveyance direction of the can 10 differ from each other and the respective positions in the axial direction of the can 10 differ from each other.

As a result, in the axial direction of the can 10 (in the longitudinal direction of the inkjet head 20), at a location adjacent to one same-color inkjet head 20, a space in which no inkjet head 20 is disposed is formed.

The exemplary embodiment utilizes the space. Specifically, the inkjet head 20 that ejects ink of another color is provided in the space. This reduces the printing positions, and as described above, it is possible to downsize the printing apparatus 100. Further, the number of mandrels 11 to be used can be suppressed.

In the above, the printing mode in which the inkjet head 20 is shorter than the length of the can 10 in the axial direction has been described; however, a printing mode in which the inkjet head 20 is longer than the entire length of the can 10 (hereinafter, referred to as "long head printing mode") can also be considered, and in the case of the long head printing mode, it is unnecessary to prepare two inkjet heads 20 for each color, but is sufficient to prepare one inkjet head 20 for each color. Then, in this case, less printing positions are needed, and accordingly, upsizing of the apparatus can be suppressed.

Specifically, for example, in the case of using four colors, namely, cyan, magenta, yellow and black, only 4 printing positions are required, and accordingly, upsizing of the apparatus can be suppressed.

On the other hand, in the configuration of the exemplary embodiment, less printing positions are needed, and accordingly, upsizing of the apparatus can be suppressed as in the above-described long head printing mode. Specifically, only 5 printing positions, close to the above-described 4 printing positions, are needed, and accordingly, upsizing of the apparatus can be suppressed. To additionally describe, despite the inkjet head 20 being shorter than the length of the can 10 in the axial direction and need for preparing two inkjet heads 20 for each color, only 5 printing positions are required to be provided, and accordingly, upsizing of the apparatus can be suppressed.

Here, the order of ink to be supplied to the can 10 will be described.

In the example shown in FIGS. 4A and 4B, the ink finally supplied to the region on the lower side of the outer circumferential surface of the can 10 (hereinafter, referred to as "lower-side printing region") is black. Moreover, the ink finally supplied to the region on the upper side of the outer circumferential surface of the can 10 (hereinafter, referred to as "upper-side printing region") is also black. In other words, in the exemplary embodiment, the color of the ink finally supplied to each of the lower-side printing region and the upper-side printing region is black.

Here, in either or both of the lower-side printing region and the upper-side printing region, if black is not the last ink and any of other colors is set as the last ink (in the case where black ink is used as one of first to third ink), since the black color has strong characteristics as color, there is a possibility that impression of the image formed in each of the lower-side printing region and the upper-side printing region differs from the predetermined and assumed impression. Therefore, in the exemplary embodiment, black is disposed last in each of the regions.

Further, in the exemplary embodiment, in regard to the color of ink, printing order is the same in the lower-side printing region and the upper-side printing region for the similar reason. In other words, in the exemplary embodiment, image formation on the lower-side printing region is performed in the order of cyan, magenta, yellow and black. Moreover, image formation on the upper-side printing region is also performed in the order of cyan, magenta, yellow and black.

If the printing order (supply order of ink) is different between the lower-side printing region and the upper-side printing region, there is a possibility that the impression of the image formed on the lower-side printing region and the impression of the image formed on the upper-side printing region differ from each other. In the case where the printing order is the same in the lower-side printing region and the upper-side printing region, such a trouble is less likely to occur.

Next, an overall configuration of the printing apparatus 100 will be described.

Figure 5:
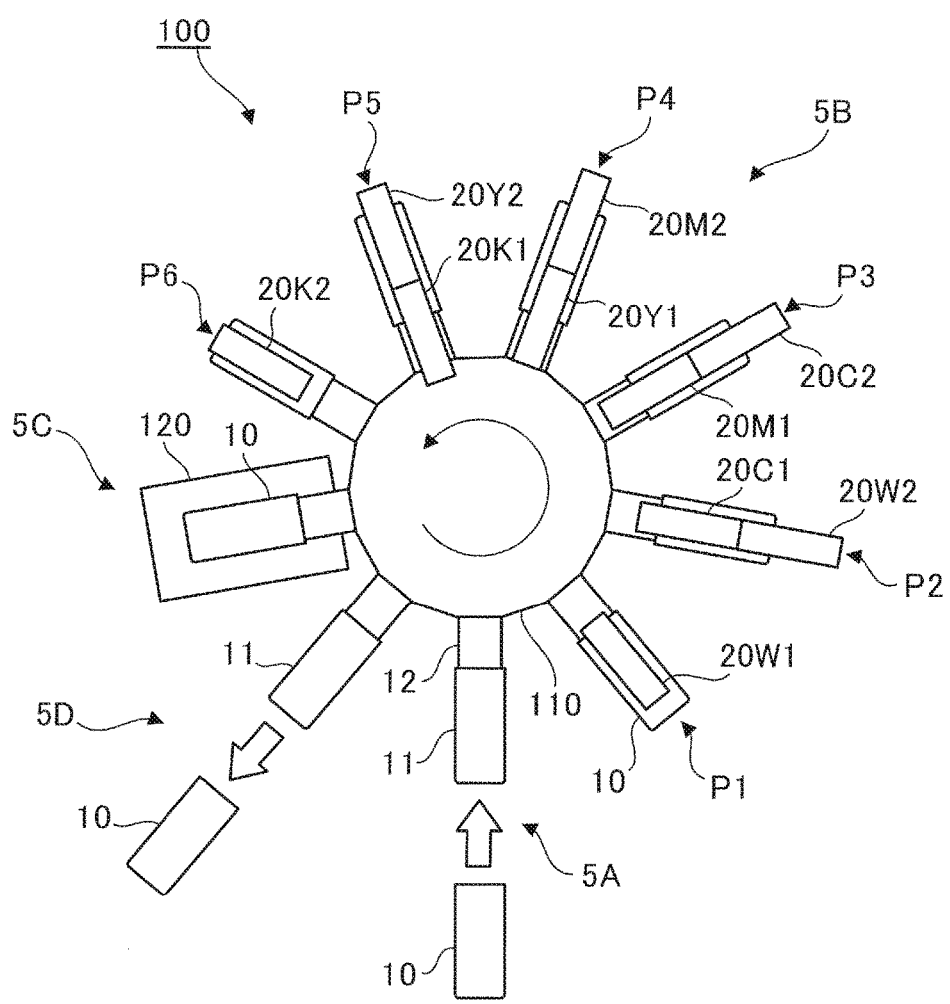
FIG. 5 is a diagram showing an overall configuration of the printing apparatus.

FIG. 5 is a diagram showing the overall configuration of the printing apparatus 100. Note that, in FIG. 5, the printing apparatus 100 is shown in a state being viewed from above. Moreover, in the printing apparatus 100, ink of 5 colors, namely, cyan, magenta, yellow, black plus white, is used. Further, in the printing apparatus 100, UV-curable ink is used.

As shown in the figure, at the center position of the printing apparatus 100, a rotatable turret 110 in a columnar shape is provided. The rotatable turret 110 is, as indicated by arrow in the figure, rotated in the counterclockwise direction. In the exemplary embodiment, by the rotatable turret 110 that functions as part of a conveyance unit, the can 10 is conveyed along the conveyance route in an annular shape.

Outside the rotatable turret 110, 9 mandrels 11 are disposed, and further, between each mandrel 11 and the rotatable turret 110, a support pillar 12 for supporting the mandrel 11 is provided. Here, each of the mandrels 11 and each of the support pillars 12 are disposed at equal spaces in the circumferential direction of the rotatable turret 110.

Further, in the printing apparatus 100 of the exemplary embodiment, motors (not shown) that rotate the mandrels 11 in the circumferential direction are provided to the support pillar 12. Moreover, rotary encoders (not shown) that detect rotating angles of the mandrels 11 are provided to the support pillar 12. Note that plural motors and rotary encoders are provided to correspond to plural mandrels 11.

Further, to the printing apparatus 100, a can supply section 5A, an image forming section 5B, a can drying section 5C and a can discharging section 5D, to which the can 10 is sequentially supplied, are provided.

Note that, in the image forming section 5B as an example of an image formation unit, a first printing position P1 to a sixth printing position P6 are provided; in each of the first printing position P1 to the sixth printing position P6, movement of the can 10 is temporarily stopped and image formation onto the can 10 is performed. In detail, in each of the first printing position P1 to the sixth printing position P6, the inkjet head 20 is disposed, and the ink is ejected from the inkjet head 20 to the rotating can 10, and thereby an image is formed on the outer circumferential surface of the can 10.

Further description will be provided in detail.

In the printing apparatus 100, first, at the can supply section 5A, the mandrel 11 starts to hold the can 10. Though description has been omitted in the above, a suction hole is formed at the tip end portion of the mandrel 11. Then, in the exemplary embodiment, suction of the can 10 is carried out by generating negative pressure inside the mandrel 11. This allows the mandrel 11 to enter into the can 10, and the mandrel 11 starts to hold the can 10. Further, in the exemplary embodiment, rotation of the mandrel 11 in the circumferential direction is also carried out.

Thereafter, the mandrel 11 holding the can 10 arrives at the first printing position P1. At the first printing position P1, a first white inkjet head 20W1 positioned above the mandrel 11 starts to eject white ink. Consequently, a white image is formed on one of the two regions that face each other with a white printing boundary interposed therebetween. Moreover, at the first printing position P1, when ejection of ink toward the can 10 is started, the printing starting position on the can 10 is detected by the rotary encoder provided to the support pillar 12.

Next, the rotatable turret 110 is rotated, and thereby the can 10 arrives at the second printing position P2. At the second printing position P2, a second white inkjet head 20W2 and the first cyan inkjet head 20C1 are provided, and ejection of ink toward the can 10 positioned below is carried out by the two inkjet heads 20. Note that, at the second printing position P2, the printing starting position for the second printing position P2 is determined with reference to the printing starting position detected at the first printing position P1, and ejection of ink toward the can 10 is performed.

Consequently, a white image is formed on the other one of the two regions that faces each other with a white printing boundary interposed therebetween, and accordingly, as to white, a state is brought about in which the entire image is formed. Further, due to ejection of ink from the first cyan inkjet head 20C1, a cyan image is formed on one of the two regions that face each other with the cyan printing boundary interposed therebetween.

Thereafter, the rotatable turret 110 is rotated again, and thereby the can 10 arrives at the third printing position P3. At the third printing position P3, the second cyan inkjet head 20C2 and the first magenta inkjet head 20M1 are provided, and ejection of ink toward the can 10 positioned below is carried out by the two inkjet heads 20. Note that, at the third printing position P3, the printing starting position for the third printing position P3 is also determined with reference to the printing starting position detected at the first printing position P1, and ejection of ink toward the can 10 is performed.

Consequently, a cyan image is formed on the other one of the two regions that faces each other with the cyan printing boundary interposed therebetween, and accordingly, as to cyan, a state is brought about in which the entire image is formed. Further, due to ejection of ink from the first magenta inkjet head 20M1, a magenta image is formed on one of the two regions that face each other with the magenta printing boundary interposed therebetween.

Thereafter, the rotatable turret 110 is rotated again, and thereby the can 10 arrives at the fourth printing position P4. At the fourth printing position P4, the second magenta inkjet head 20M2 and the first yellow inkjet head 20Y1 are provided, and ejection of ink toward the can 10 positioned below is carried out by the two inkjet heads 20. Note that, at the fourth printing position P4, the printing starting position for the fourth printing position P4 is also determined with reference to the printing starting position detected at the first printing position P1, and ejection of ink toward the can 10 is performed.

Consequently, a magenta image is formed on the other one of the two regions that faces each other with the magenta printing boundary interposed therebetween, and accordingly, as to magenta, a state is brought about in which the entire image is formed. Further, due to ejection of ink from the first yellow inkjet head 20Y1, a yellow image is formed on one of the two regions that face each other with the yellow printing boundary interposed therebetween.

Next, the rotatable turret 110 is rotated again, and thereby the can 10 arrives at the fifth printing position P5. At the fifth printing position P5, the second yellow inkjet head 20Y2 and the first black inkjet head 20K1 are provided, and ejection of ink toward the can 10 positioned below is carried out by the two inkjet heads 20. Note that, at the fifth printing position P5, the printing starting position for the fifth printing position P5 is also determined with reference to the printing starting position detected at the first printing position P1, and ejection of ink toward the can 10 is performed.

Consequently, a yellow image is formed on the other one of the two regions that faces each other with the yellow printing boundary interposed therebetween, and accordingly, as to yellow, a state is brought about in which the entire image is formed. Further, due to ejection of ink from the first black inkjet head 20K1, a black image is formed on one of the two regions that face each other with the black printing boundary interposed therebetween.

Next, the rotatable turret 110 is rotated again, and thereby the can 10 arrives at the sixth printing position P6. At the sixth printing position P6, the second black inkjet head 20K2 is provided, and ejection of ink toward the can 10 positioned below is carried out by the second black inkjet head 20K2. Note that, at the sixth printing position P6, the printing starting position for the sixth printing position P6 is also determined with reference to the printing starting position detected at the first printing position P1, and ejection of ink toward the can 10 is performed.

Consequently, a black image is formed on the other one of the two regions that faces each other with the black printing boundary interposed therebetween, and accordingly, as to black, a state is brought about in which the entire image is formed.

Thereafter, the rotatable turret 110 is rotated again, and thereby the can 10 arrives at the can drying section 5C. Here, to dry (cure) the ink of each color applied to the surface of the can 10, UV light is emitted to the can 10 from a UVLED (Ultraviolet Light Emitting Diode) 120. Note that, at this time, the can 10 is also rotated in the circumferential direction, and accordingly, the UV light is emitted over the entire region on the outer circumferential surface of the can 10.

Thereafter, in the exemplary embodiment, the rotatable turret 110 is rotated again, and thereby the can 10 arrives at the can discharging section 5D; at the can discharging section 5D, the can 10 is detached from the mandrel 11. Here, detachment of the can 10 from the mandrel 11 is carried out by supplying compressed air into the mandrel 11.

Note that, between the can drying section 5C and the can discharging section 5D, an overcoat forming section that applies paint on the surface of the can 10 to form an overcoat layer and a drying section for drying the overcoat layer may be provided in addition.

Figure 6:
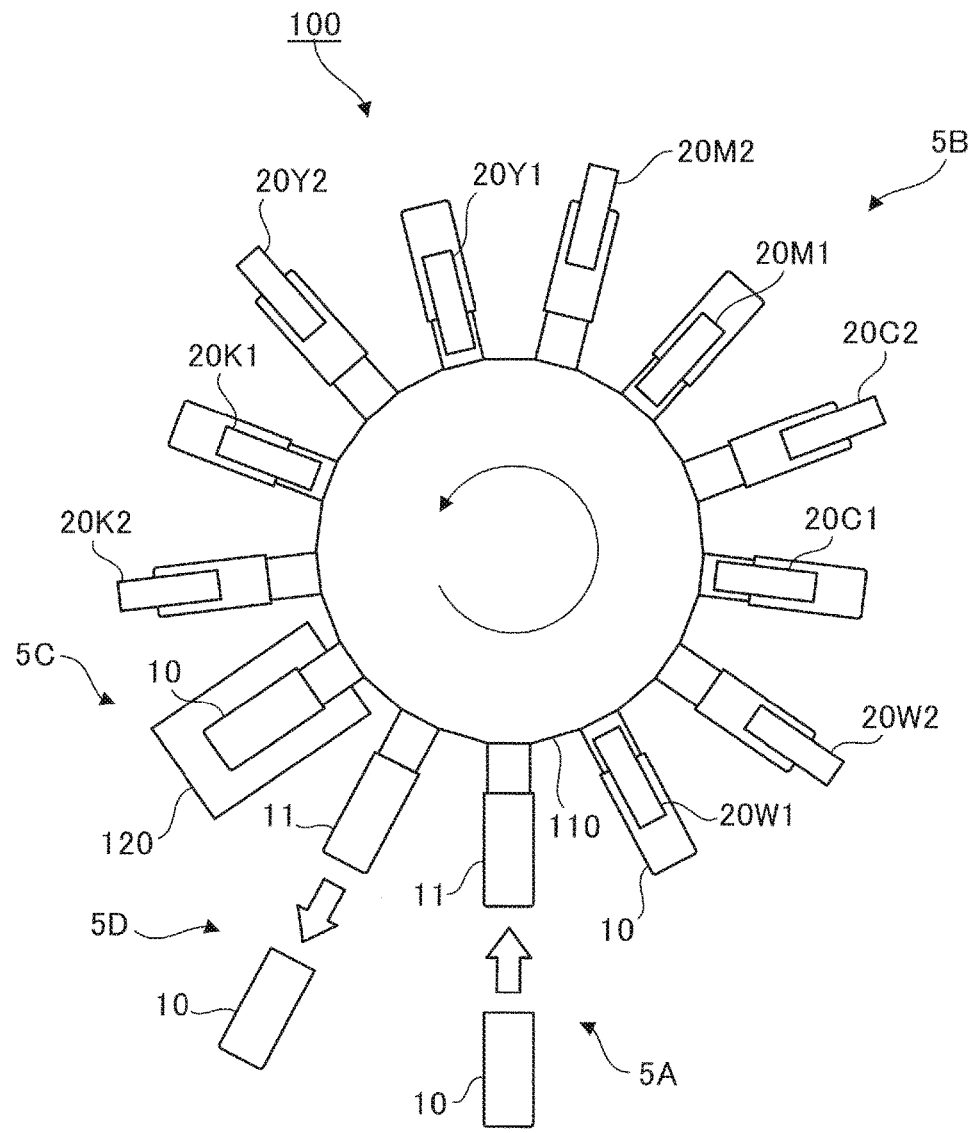
FIG. 6 is a diagram showing the printing apparatus that performs printing in a printing mode shown in FIGS. 3A and 3B.

FIG. 6 is a diagram showing the printing apparatus 100 that performs printing in the printing mode shown in FIGS. 3A and 3B.

Note that the functional sections having the same functions as the respective functional sections possessed by the printing apparatus 100 are assigned reference signs same as those used in FIG. 5.

In the printing apparatus 100 shown in FIG. 6, two inkjet heads 20 are provided for each color, and further, respective inkjet heads 20 are individually provided; therefore, 10 printing positions are provided in total.

As a result, in the printing apparatus 100, the apparatus is upsized as compared to the printing apparatus 100 of the exemplary embodiment shown in FIG. 5.

Further, in the printing apparatus 100 shown in FIG. 6, there occurs a need for preparing 13 mandrels 11 in total, and further, there also occurs a need for preparing 13 motors or the like, which correspond to the respective 13 mandrels 11, to rotate mandrels 11. On the other hand, in the printing apparatus 100 of the exemplary embodiment shown in FIG. 5, it is sufficient to prepare 9 mandrels 11, and it is also sufficient to prepare 9 motors or the like to rotate the mandrels 11.

Figure 7A:
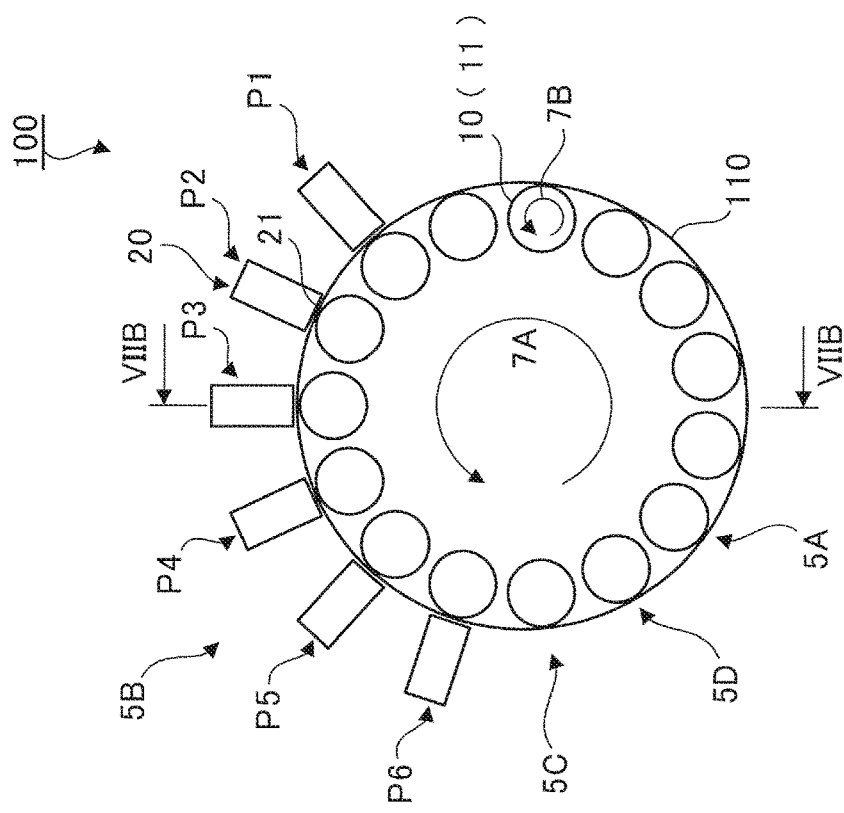
FIGS. 7A and 7B are diagrams showing another configuration example of the printing apparatus of the exemplary embodiment.
Figure 7B:
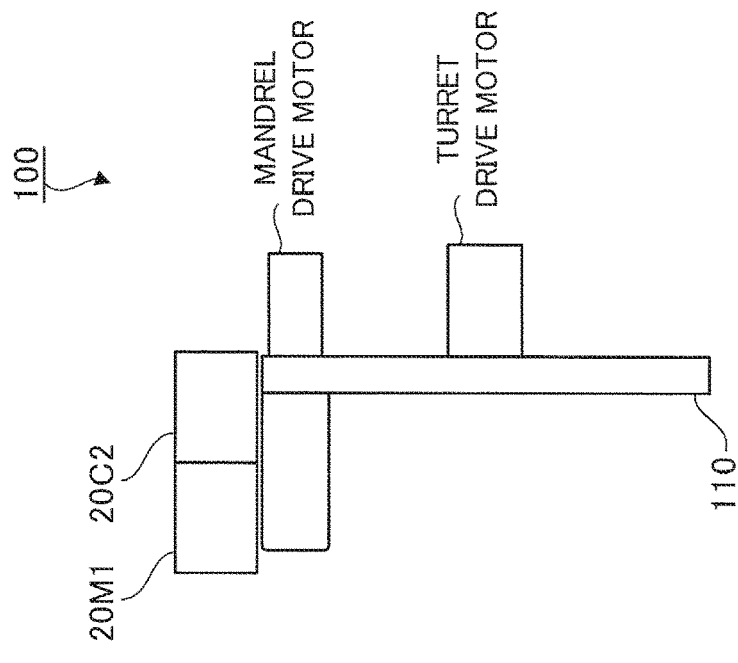

FIGS. 7A and 7B are diagrams showing another configuration example of the printing apparatus 100 of the exemplary embodiment. Note that FIG. 7A is an elevational view of the printing apparatus 100, and FIG. 7B is a cross-sectional view along the VIIB-VIIB line in FIG. 7A.

In the printing apparatus 100, the rotatable turret 110 is provided in a standing state. To additionally describe, in the printing apparatus 100 of the exemplary embodiment, the rotatable turret 110 is provided so that a rotational axis of the rotatable turret 110 extends along the horizontal direction. The rotatable turret 110 is, as indicated by arrow 7A in FIG. 7A, rotated in the counterclockwise direction.

Further, in the exemplary embodiment, the mandrels 11 are disposed near the outer circumference of the rotatable turret 110. The plural mandrels 11 are provided in line along the circumferential direction of the rotatable turret 110. Further, though illustration is omitted, the rotatable turret 110 is provided with plural motors corresponding to the respective mandrels 11 to rotate the mandrels 11 in the direction indicated by arrow 7B in FIG. 7A.

Above the rotatable turret 110, plural inkjet heads 20 are provided. Each of the inkjet heads 20 is disposed such that the bottom surface 21 thereof faces toward the rotation center of the rotatable turret 110. Here, also in the printing apparatus 100, similar to the above, the first printing position P1 to the sixth printing position P6 are provided.

Though illustration is omitted, at the first printing position P1, similar to the above (similar to FIG. 5), the first white inkjet head 20W1 is provided. Moreover, at the second printing position P2, the second white inkjet head 20W2 and the first cyan inkjet head 20C1 are provided. Moreover, at the third printing position P3, as also shown in FIG. 7B, the second cyan inkjet head 20C2 and the first magenta inkjet head 20M1 are provided.

Further, at the fourth printing position P4, the second magenta inkjet head 20M2 and the first yellow inkjet head 20Y1 are provided. Further, at the fifth printing position P5, the second yellow inkjet head 20Y2 and the first black inkjet head 20K1 are provided, and at the sixth printing position P6, the second black inkjet head 20K2 is provided.

Further, though detailed illustration is omitted, on the upstream side of the first printing position P1 in the conveyance direction of the can 10, the can supply section 5A is provided. Further, on the downstream side of the sixth printing position P6 in the conveyance direction of the can 10, the can drying section 5C is provided. Further, on the downstream side of the can drying section 5C in the moving direction of the can 10, the can discharging section 5D is provided.

(Another Arrangement Example of the Inkjet Heads 20 in Each Printing Apparatus)

At each of the plural provided printing positions, it can be considered that two inkjet heads 20 are disposed in a state being displaced from each other in the circumferential direction of the can 10 as shown in FIG. 8A (a diagram showing another disposition example of the inkjet heads 20), not being arranged linearly along the axial direction of the can 10. In such a case, at each printing position, it is possible to form an image of one color over the entire region on the outer circumferential surface of the can 10, and accordingly, it is sufficient to prepare the printing positions of the number corresponding to the number of colors.

By the way, in the printing mode shown in FIG. 8A, each of the inkjet heads 20 is not disposed on the vertical line passing through the center of the can 10, and is disposed at a position displaced from the vertical line. In such a case, as described above, the ink ejected from the inkjet head 20 adheres to the side surface of the can 10, and the shape of the adhered ink is likely to expand in the circumferential direction of the can 10. In such a case, there is a possibility of causing deterioration in quality of the image to be formed.

On the other hand, in the configuration of the exemplary embodiment, as shown in FIGS. 4A and 4B, etc., each of the inkjet heads 20 is disposed on the vertical line passing through the center of the can 10, and the ink ejected from the inkjet head 20 adheres to the top portion of the can 10. In such a case, as compared to the case in which the ink adheres to the lateral side of the can 10, expansion of the ink in the circumferential direction of the can 10 can be suppressed.

FIG. 8B is a diagram showing a printing mode in which each of the inkjet heads 20 is disposed to be inclined so that the bottom surface 21 provided to the inkjet head 20 faces the outer circumferential surface of the can 10. In this printing mode, substantially, the ink from the inkjet head 20 comes to adhere to a portion equivalent to the top portion of the can 10, and accordingly, it becomes possible to suppress expansion of the ink in the circumferential direction of the can 10.

By the way, in the printing mode, as described above, ink accumulation is apt to be formed at outlet portions of the ink ejection holes 22; then, in this case, being affected by the ink accumulation, there is a possibility that the ejection direction of ink differs from the original direction thereof.

Further, in the printing mode, if the can 10 is conveyed simply along the horizontal direction, the inkjet heads 20 and the can 10 interfere with each other. Therefore, there occurs a need to move the can 10 not only in the horizontal direction, but also in the vertical direction as indicated by arrows 8A and 8B in FIG. 8B. In such a case, increase in complexity of the apparatus, deterioration in printing efficiency or the like is caused.

On the other hand, in the configuration of the exemplary embodiment, since the ink is ejected right below the inkjet head 20, the ink accumulation is less likely to be formed, and there is an increased possibility that the ink adheres to the adhesion position that is originally intended.

Moreover, in the configuration of the exemplary embodiment, it becomes possible to carry out image formation onto the can 10 in the course of moving the can 10 only in the horizontal direction, and accordingly, increase in complexity of the apparatus can be avoided. Moreover, it becomes possible to suppress deterioration in printing efficiency.

(Others)

Figure 9:
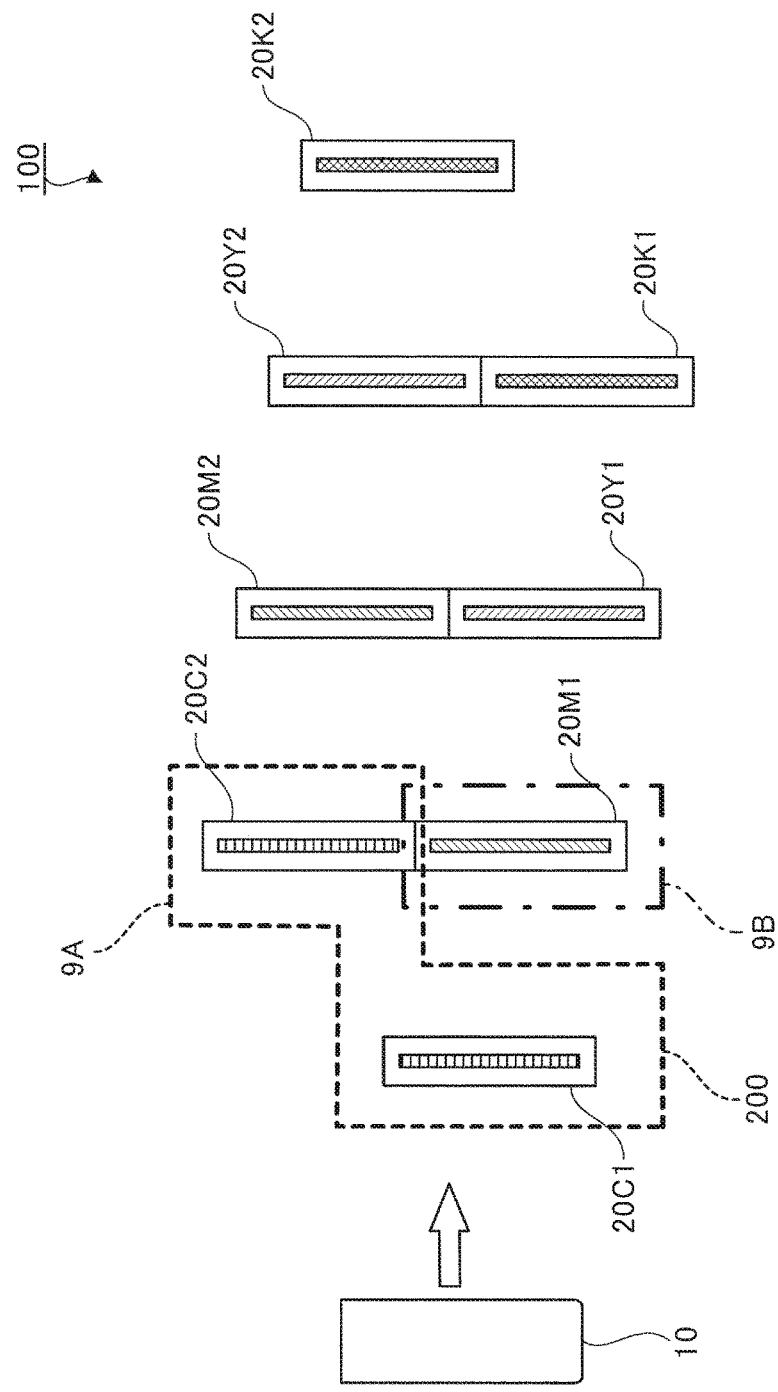
FIG. 9 is a diagram schematically showing the printing apparatus of the exemplary embodiment.

From another point of view, in the printing apparatus 100 of the exemplary embodiment shown in FIGS. 4A and 4B, the two inkjet heads 20 that eject ink of the same color can be grasped as one inkjet head group 200 (hereinafter, referred to as "same-color inkjet head group 200"), as shown in FIG. 9 (a diagram schematically showing the printing apparatus 100 of the exemplary embodiment).

To additionally describe, like the first cyan inkjet head 20C1 and the second cyan inkjet head 20C2 positioned inside the frame indicated by the reference sign 9A in FIG. 9, two inkjet heads 20 that eject ink of the same color can be grasped as one same-color inkjet head group 200.

Then, the exemplary embodiment has a configuration in which plural same-color inkjet head groups 200 are provided so as to correspond to the respective four colors, cyan, magenta, yellow and black, and each of the same-color inkjet head groups 200 is arranged in line in the conveyance direction of the can 10. To additionally describe, in the exemplary embodiment, the respective same-color inkjet head groups 200 are disposed so that the respective positions thereof in the conveyance direction of the can 10 differ from each other.

To describe further, in the exemplary embodiment, at a location adjacent to the inkjet head 20 positioned at the most downstream side in the conveyance direction of the can 10, which is among the inkjet heads 20 included in the single same-color inkjet head group 200 positioned at the most upstream side in the conveyance direction of the can 10 (an adjacent location in the longitudinal direction of the inkjet head 20 and also an adjacent location in the axial direction of the can 10), a space in which no inkjet head 20 is disposed is formed.

To describe with reference to FIG. 9, at the location indicated by reference sign 9B in the figure, a space in which no inkjet head 20 is disposed is formed. More specifically, at a location adjacent the second cyan inkjet head 20C2, a space in which no inkjet head 20 is disposed is formed.

Then, in the exemplary embodiment, in the space, the inkjet head 20 included in the same-color inkjet head group 200 positioned at the downstream side is disposed. To additionally describe, of the inkjet heads 20 included in the same-color inkjet head group 200 of another color, the inkjet head 20 positioned most upstream side in the conveyance direction of the can 10 is disposed. More specifically, the first magenta inkjet head 20M1 is disposed.

Consequently, the above space does not become a dead space, and therefore, plural inkjet heads 20 are disposed in a closer state. Then, in this case, it becomes possible to make the printing apparatus 100 much smaller.

Here, in the case of the configuration shown in FIG. 9, the inkjet heads 20 of the same color are disposed collectively for each color, and therefore, as compared to the configuration in which the inkjet heads 20 of the same color are not disposed collectively for each color (for example, a configuration shown in FIG. 10 to be described later), the configuration of the apparatus can be simplified. To additionally describe, it can be seen more clearly where the inkjet heads 20 of each color are disposed. Then, in this case, for example, installation errors of components in the manufacturing stage of the printing apparatus 100 can be suppressed.

Note that, of the plural same-color inkjet head groups 200, the same-color inkjet head group 200 positioned most downstream side in the conveyance direction of the can 10 is the same-color inkjet head group 200 that ejects black ink.

As described above, in either or both of the lower-side printing region and the upper-side printing region, if black is not the last ink, since the black color has strong characteristics as color, there is a possibility that impression of the image formed in each of the lower-side printing region and the upper-side printing region differs from the predetermined and assumed impression. Therefore, in the exemplary embodiment, the same-color inkjet head group 200 positioned most downstream side in the conveyance direction of the can 10 is the same-color inkjet head group 200 that ejects black ink.

Other configuration examples will be further described.

In the above, description has been given by taking the case, in which two inkjet heads 20 ejecting the same-color ink are disposed at printing positions adjacent to each other, such as providing the second cyan inkjet head 20C2 immediately downstream of the first cyan inkjet head 20C1, as an example.

Figure 10:
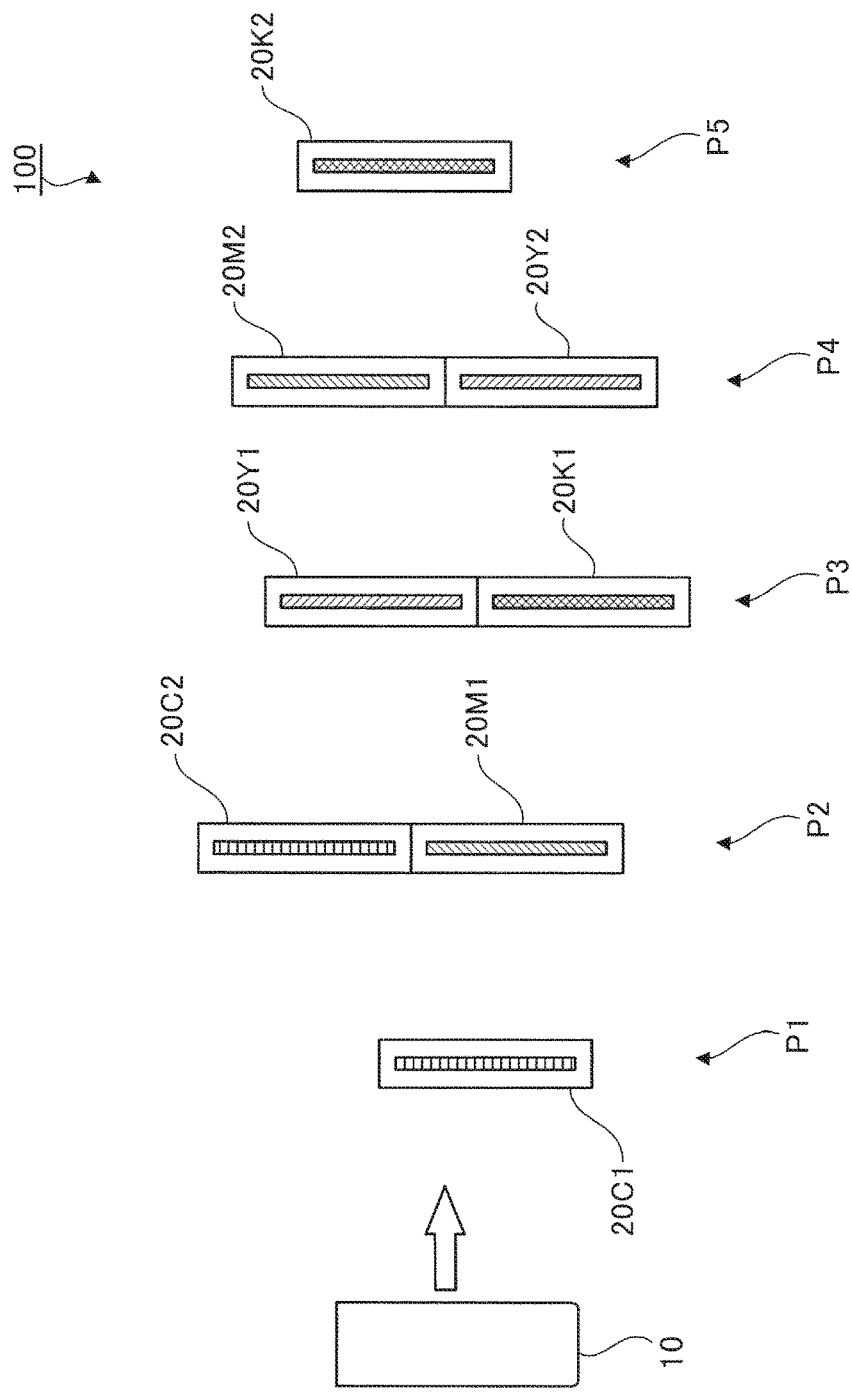
FIG. 10 is a diagram schematically showing another configuration example of the printing apparatus of the exemplary embodiment.

By the way, not limited to the mode like this, as shown in FIG. 10 (a diagram schematically showing another configuration example of the printing apparatus 100 of the exemplary embodiment), two inkjet heads 20 that eject the same color may be provided at the two respective printing positions that are not adjacent to each other, for example, at the second printing position P2 and the fourth printing position P4. FIG. 10 exemplifies the case in which the first magenta inkjet head 20M 1 is disposed at the second printing position P2 and the second magenta inkjet head 20M2 is disposed at the fourth printing position P4.

Moreover, in the example shown in FIG. 10, at the fourth printing position P4, the second yellow inkjet head 20Y2 is disposed below the second magenta inkjet head 20M2 in the figure. Further, the first yellow inkjet head 20Y1 is disposed at the third printing position P3, and below the first yellow inkjet head 20Y1 disposed at the third printing position P3 in the figure, the first black inkjet head 20K1 is disposed. Further, the second black inkjet head 20K2 is disposed at the fifth printing position P5.

Moreover, in the above, as shown in FIGS. 4A and 4B, the case of providing the one inkjet head 20 at the first printing position P1 has been described. Incidentally, not limited thereto, two inkjet heads 20 may be provided at the first printing position P1. To specifically describe, for example, the second cyan inkjet head 20C2 and the first magenta inkjet head 20M1, which are positioned at the second printing position P2 in FIGS. 4A and 4B, may be provided at the first printing position P1 as shown in FIG. 11 (a diagram schematically showing another configuration example of the printing apparatus 100 of the exemplary embodiment).

Note that, in this case, for example, disposed positions of the respective inkjet heads 20 are pushed up, and thereby, the respective inkjet heads 20 at the third printing position P3 to the fifth printing position P5 in FIGS. 4A and 4B are disposed at the second printing position P2 to the fourth printing position P4 as shown in FIG. 11. Moreover, the first cyan inkjet head 20C1 at the first printing position P1 in FIGS. 4A and 4B is disposed at the fifth printing position P5 as shown in FIG. 11.

Moreover, in the exemplary embodiment, as shown in FIG. 5, description has been given by taking the case in which image formation onto the can 10 has been performed in the course of conveying the can 10 along the annual conveyance route as an example; however, it may be possible to convey the can 10 along a linear conveyance route, and in the course of conveying, perform image formation onto the can 10.

Moreover, in the above, the case of using ink of four or five colors has been exemplified; however, if the ink of at least two colors is used, the effect to reduce the printing positions is exerted. For example, in the case of using the ink of two colors and of the printing mode shown in FIGS. 3A and 3B, four printing positions are required; however, in the configuration of the exemplary embodiment, it is sufficient to have three printing positions.

Moreover, in the above, since the inkjet head 20 is shorter than the length of the can 10 in the axial direction, there is a need to prepare the plural inkjet heads 20 for each color; however, even if the inkjet head 20 is longer than the length of the can 10 in the axial direction, if the ink ejection hole formation region 23 (refer to FIG. 1C) is smaller than the length of the can 10 in the axial direction, there occurs a need to prepare plural inkjet heads 20 for each color.

In other words, the configuration of the exemplary embodiment can be applied, not only to the mode in which the inkjet head 20 is shorter than the length of the can 10 in the axial direction, but also to the case in which the inkjet head 20 is longer than the length of the can 10 in the axial direction.

Figure 12A:
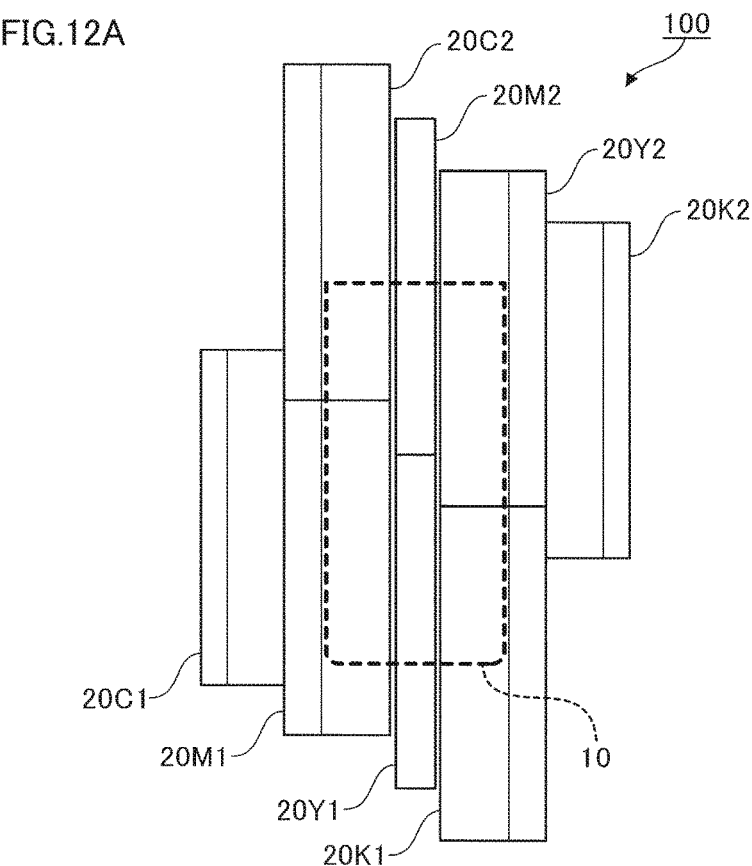
FIGS. 12A and 12B are diagrams showing another configuration example of the printing apparatus of the exemplary embodiment.
Figure 12B:
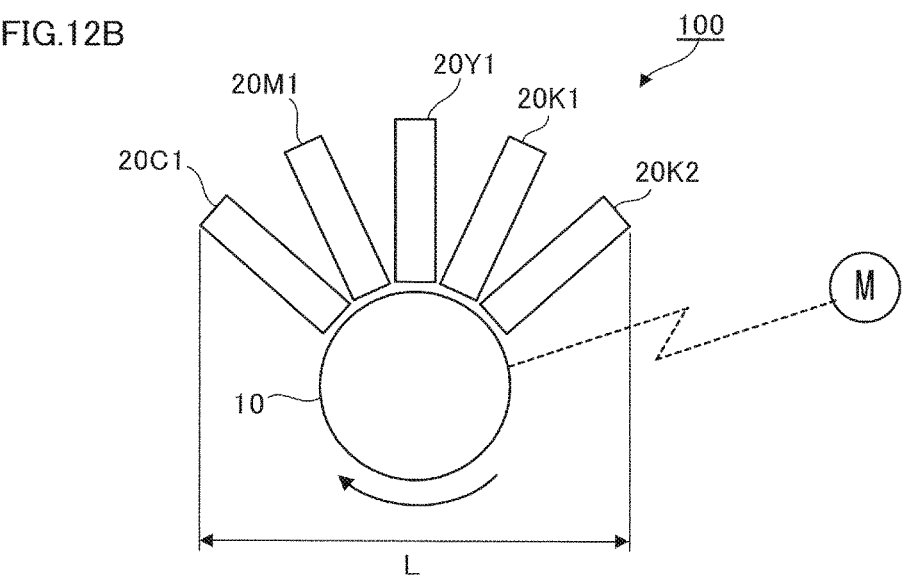

Moreover, the configuration of the exemplary embodiment is applicable to the printing apparatus 100 shown in FIGS. 12A and 12B (diagrams showing another configuration example of the printing apparatus 100 of the exemplary embodiment). Note that FIG. 12A is a top view of the printing apparatus 100, and FIG. 12B is an elevational view of the printing apparatus 100.

In the printing apparatus 100, as shown in FIG. 12B, the can 10 is rotated in the circumferential direction by a motor M that functions as a rotation unit. Further, above the can 10, as shown in FIG. 12B, plural inkjet heads 20 disposed radially around the axial center of the can 10 are provided.

Here, the plural inkjet heads 20 are disposed in a similar shape as in the above, and as shown in FIG. 12A, at the most upstream side in the rotation direction of the can 10, the first cyan inkjet head 20C1 is disposed.

Further, in the rotation direction of the can 10, on the downstream side of the first cyan inkjet head 20C1, the second cyan inkjet head 20C2 and the first magenta inkjet head 20M1 are disposed. Further, in the rotation direction of the can 10, on the downstream side of the second cyan inkjet head 20C2 and the first magenta inkjet head 20M 1, the second magenta inkjet head 20M2 and the first yellow inkjet head 20Y1 are disposed.

Further, in the rotation direction of the can 10, on the downstream side of the second magenta inkjet head 20M2 and the first yellow inkjet head 20Y1, the second yellow inkjet head 20Y2 and the first black inkjet head 20K1 are disposed. Further, in the rotation direction of the can 10, on the downstream side of the second yellow inkjet head 20Y2 and the first black inkjet head 20K1, the second black inkjet head 20K2 is disposed.

In the exemplary embodiment, similar to the above, the cyan image is formed over the entire region on the outer circumferential surface of the can 10 by the first cyan inkjet head 20C1 and the second cyan inkjet head 20C2, and the magenta image is formed over the entire region on the outer circumferential surface of the can 10 by the first magenta inkjet head 20M1 and the second magenta inkjet head 20M2. Further, the yellow image is formed over the entire region on the outer circumferential surface of the can 10 by the first yellow inkjet head 20Y1 and the second yellow inkjet head 20Y2, and the black image is formed over the entire region on the outer circumferential surface of the can 10 by the first black inkjet head 20K1 and the second black inkjet head 20K2.

Here, in the configuration of the exemplary embodiment, part of the inkjet heads 20 is inclined with respect to the vertical direction; in this case, the ink accumulation described above is apt to be formed.

On the other hand, in the configuration of the exemplary embodiment, it becomes possible to dispose the inkjet heads 20 in a closer state, to thereby make the printing apparatus 100 much smaller.

To additionally describe, in the configuration of the exemplary embodiment, it is possible to make the width L of the portion where the inkjet heads 20 are provided smaller, to thereby make the printing apparatus 100 much smaller. In the disposition mode of the inkjet heads 20 as shown in FIGS. 3A and 3B, the number of inkjet heads 20 arranged in the circumferential direction of the can 10 becomes twice as much as the number shown in FIGS. 12A and 12B, and therefore, the width L becomes large.

REFERENCE SIGNS LIST

5B Image forming section
10 Can
20 Inkjet head
100 Printing apparatus
110 Rotatable turret
200 Same-color inkjet head group
M Motor

The invention claimed is:

1. A printing apparatus comprising:
   a conveyance unit that conveys a can in a cylindrical shape along a predetermined conveyance route, the cylindrical shape of the can defined by an outer circumferential surface extending in an axial direction of the can; and
   an image formation unit that forms an image composed of a plurality of colors onto the outer circumferential surface of the can on the conveyance route by use of a plurality of inkjet heads prepared for the respective colors, wherein,
   among inkjet heads included in the plurality of inkjet heads, each of same-color inkjet heads ejecting ink of same color is disposed at a position different from one another in a conveyance direction of the can, and is disposed at a position, which is also a position against the can when image formation onto the can is performed, different from one another in the axial direction of the can and along the axial direction of the can, the each of the same-color inkjet heads performing image formation onto a partial region of the can in the axial direction thereof, and,
   at an adjacent location that is adjacent to at least one same-color inkjet head in the axial direction of the can, among the individual same-color inkjet heads included in the same-color inkjet heads, an inkjet head that ejects ink of a color different from the same-color inkjet head toward the can is provided,
   wherein the conveyance unit is configured to convey the can in the conveyance direction on the predetermined conveyance route between each of the different positions of the same-color inkjet heads,
   wherein the printing apparatus is capable of simultaneously ejecting to the same can both the same color ink and the ink of the color different from the same-color ink, and
   being disposed at the position different from one another in the conveyance direction of the can means that the can must be conveyed by the conveyance unit in the conveyance direction for each of the same-color inkjet heads to eject the same color ink on the can.

2. The printing apparatus according to claim 1, wherein a same-color inkjet head group is configured with a plurality of the same-color inkjet heads,
   a plurality of the same-color inkjet head groups are provided to correspond to the plurality of colors that compose the image, respectively,
   the plurality of provided same-color inkjet head groups are disposed at positions different from one another in the conveyance direction of the can, and
   each of the same-color inkjet head groups is disposed such that, at the adjacent location of a same-color inkjet head positioned at a most downstream side in the conveyance direction of the can, among the same-color inkjet heads included in one of the same-color inkjet head groups positioned at an upstream side in the conveyance direction of the can, a same-color inkjet head included in one of the other same-color inkjet head group positioned at the downstream side, which is also a same-color inkjet head positioned at a most upstream side in the conveyance direction, is positioned.

3. The printing apparatus according to claim 2, wherein the plurality of colors composing the image include black, and
   the same-color inkjet head group ejecting black ink is disposed at a most downstream side in the conveyance direction of the can.

4. The printing apparatus according to claim 3, wherein, when image formation onto the can is performed, each of the individual same-color inkjet heads included in the same-color inkjet head group is positioned just above the can and ejects ink in a vertically downward direction, to perform image formation onto the can.

5. The printing apparatus according to claim 2, wherein, when image formation onto the can is performed, each of the individual same-color inkjet heads included in the same-color inkjet head group is positioned just above the can and ejects ink in a vertically downward direction, to perform image formation onto the can.

6. The printing apparatus according to claim 2, wherein, when image formation onto the can is performed, each of the individual same-color inkjet heads included in the same-color inkjet head group is positioned just above the can and ejects ink in a vertically downward direction, to perform image formation onto the can.

7. A printing apparatus comprising:
   a rotation unit that rotates a can in a cylindrical shape in a circumferential direction, the cylindrical shape of the can defined by an outer circumferential surface extending in an axial direction of the can; and
   an image formation unit that forms an image composed of a plurality of colors onto the outer circumferential surface of the can rotated by the rotation unit by use of a plurality of inkjet heads prepared for the respective colors, wherein,
   among inkjet heads included in the plurality of inkjet heads, each of same-color inkjet heads ejecting ink of same color is disposed at a position different from one another in a rotation direction of the can, and is disposed at a position different from one another in the axial direction of the can to perform image formation onto a partial region of the can in the axial direction thereof, and,
   at a position that is both adjacent to at least one same-color inkjet head in the axial direction of the can and the same as the same-color inkjet head in the circumferential direction of the can, among the individual same-color inkjet heads included in the same-color inkjet heads, an inkjet head that ejects ink of a color different from the same-color inkjet head toward the can is provided, and the image formation unit is configured to form the image composed of the plurality of colors on the outer circumferential surface of the can during a single rotation of the can about its axis in the circumferential direction.

8. A method for forming an image on a can, the method comprising:

conveying a can in a cylindrical shape along a predetermined conveyance route, the cylindrical shape of the can defined by an outer circumferential surface extending in an axial direction of the can; and forming an image composed of a plurality of colors onto the outer circumferential surface of the can on the conveyance route by use of a plurality of inkjet heads prepared for the respective colors, wherein, among inkjet heads included in the plurality of inkjet heads, each of same-color inkjet heads ejecting ink of same color is disposed at a position different from one another in a conveyance direction of the can, and is disposed at a position, which is also a position against the can when image formation onto the can is performed, different from one another in the axial direction of the can and along the axial direction of the can, the each of the same-color inkjet heads performing image formation onto a partial region of the can in the axial direction thereof, and, at an adjacent location that is adjacent to at least one same-color inkjet head in the axial direction of the can, among the individual same-color inkjet heads included in the same-color inkjet heads, an inkjet head that ejects ink of a color different from the same-color inkjet head toward the can is provided, wherein the can is conveyed in the conveyance direction on the predetermined conveyance route between each of the different positions of the same-color inkjet heads, and wherein the printing apparatus is capable of simultaneously ejecting to the same can both the same color ink and the ink of the color different from the same-color ink, and being disposed at the position different from one another in the conveyance direction of the can means that the can must be conveyed by the conveyance unit in the conveyance direction for each of the same-color inkjet heads to eject the same color ink on the can.

9. A method for forming an image on a can, the method comprising:

rotating a can in a cylindrical shape in a circumferential direction, the cylindrical shape of the can defined by an outer circumferential surface extending in an axial direction of the can; and forming an image composed of a plurality of colors onto the outer circumferential surface of the rotating can by use of a plurality of inkjet heads prepared for the respective colors, wherein, among inkjet heads included in the plurality of inkjet heads, each of same-color inkjet heads ejecting ink of same color is disposed at a position different from one another in a rotation direction of the can, and is disposed at a position different from one another in the axial direction of the can to perform image formation onto a partial region of the can in the axial direction thereof, and, at a position that is both adjacent to at least one same-color inkjet head in the axial direction of the can and the same as the at least one same-color inkjet head in the circumferential direction of the can, among the individual same-color inkjet heads included in the same-color inkjet heads, an inkjet head that ejects ink of a color different from the same-color inkjet head toward the can is provided, and wherein the image composed of the plurality of colors is formed on the outer circumferential surface of the can during a single rotation of the can about its axis in the circumferential direction.

* * * * *